(12) United States Patent
Tolkamp

(10) Patent No.: US 10,048,098 B2
(45) Date of Patent: Aug. 14, 2018

(54) PROBES, BLAST FURNACES EQUIPPED THEREWITH, AND METHODS OF FABRICATING PROBES

(71) Applicant: CIM-TECH INC., Valparaiso, IN (US)

(72) Inventor: Rudolph C. Tolkamp, Demotte, IN (US)

(73) Assignee: CIM-Tech Inc., Valparaiso, IN (US)

( * ) Notice: Subject to any disclaimer, the term of this patent is extended or adjusted under 35 U.S.C. 154(b) by 201 days.

(21) Appl. No.: 14/966,424

(22) Filed: Dec. 11, 2015

(65) Prior Publication Data

US 2016/0169715 A1    Jun. 16, 2016

Related U.S. Application Data

(60) Provisional application No. 62/090,562, filed on Dec. 11, 2014.

(51) Int. Cl.
| | |
|---|---|
| *G01D 11/30* | (2006.01) |
| *F27D 9/00* | (2006.01) |
| *F27D 19/00* | (2006.01) |
| *G01D 11/24* | (2006.01) |
| *C21B 7/00* | (2006.01) |
| *F27D 21/00* | (2006.01) |

(52) U.S. Cl.
CPC ............... *G01D 11/30* (2013.01); *C21B 7/00* (2013.01); *F27D 9/00* (2013.01); *F27D 19/00* (2013.01); *F27D 21/00* (2013.01); *F27D 21/0014* (2013.01); *G01D 11/245* (2013.01); *F27D 2019/0003* (2013.01); *F27D 2019/0009* (2013.01); *F27D 2019/0012* (2013.01)

(58) Field of Classification Search
CPC ... C21B 7/00; F27D 19/00; F27D 2019/0003; F27D 2019/0009; F27D 2019/0012; F27D 21/00; F27D 21/0014; F27D 9/00; F27D 11/245; F27D 11/30
USPC ........... 266/87; 374/100, 132, 133, 139, 148
See application file for complete search history.

(56) References Cited

U.S. PATENT DOCUMENTS

| | | | |
|---|---|---|---|
| 3,240,069 A | | 3/1966 | Kennedy |
| 3,301,715 A | * | 1/1967 | Gerrard ................... G01K 1/12 136/217 |
| 4,175,438 A | * | 11/1979 | Wenzl ..................... G01K 13/02 136/224 |
| 4,511,264 A | * | 4/1985 | Bucha ..................... G01K 1/14 374/121 |

(Continued)

*Primary Examiner* — Jessee Roe
*Assistant Examiner* — Michael Aboagye
(74) *Attorney, Agent, or Firm* — Hartman Global IP Law; Gary M. Hartman; Domenica N. S. Hartman

(57) ABSTRACT

Probes, blast furnaces equipped therewith, and methods of fabricating probes. Such a probe includes a base, a shell connected to the base and constructed of at least first and second housing members that extend together along a length of the probe in a longitudinal direction thereof, and at least one support structure interconnecting the first and second housing members. The probe includes a coolant circuit comprising at least one coolant passage within an interior cavity of the shell. The coolant passage has at least one tube supported by the support structure so that the tube contacts at least one of the first and second housing members. At least one sensor is disposed in the second housing member for performing a measurement at an exterior of the shell.

24 Claims, 9 Drawing Sheets

(56) References Cited

U.S. PATENT DOCUMENTS

| | | | | |
|---|---|---|---|---|
| 5,108,192 A | * | 4/1992 | Mailliet | C21C 5/4673 |
| | | | | 136/230 |
| 2012/0063488 A1 | * | 3/2012 | Nakayama | G01K 1/10 |
| | | | | 374/185 |

* cited by examiner

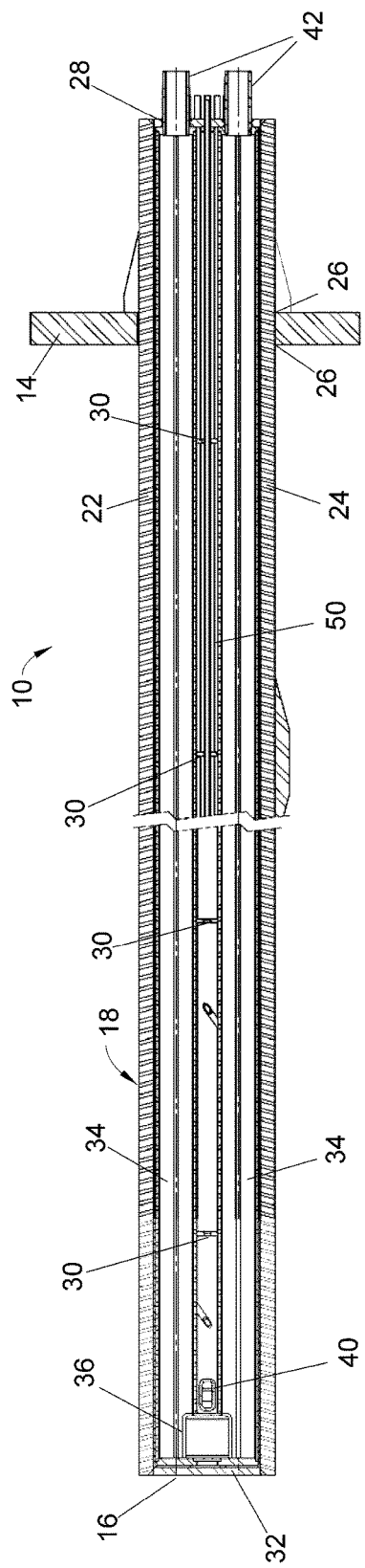
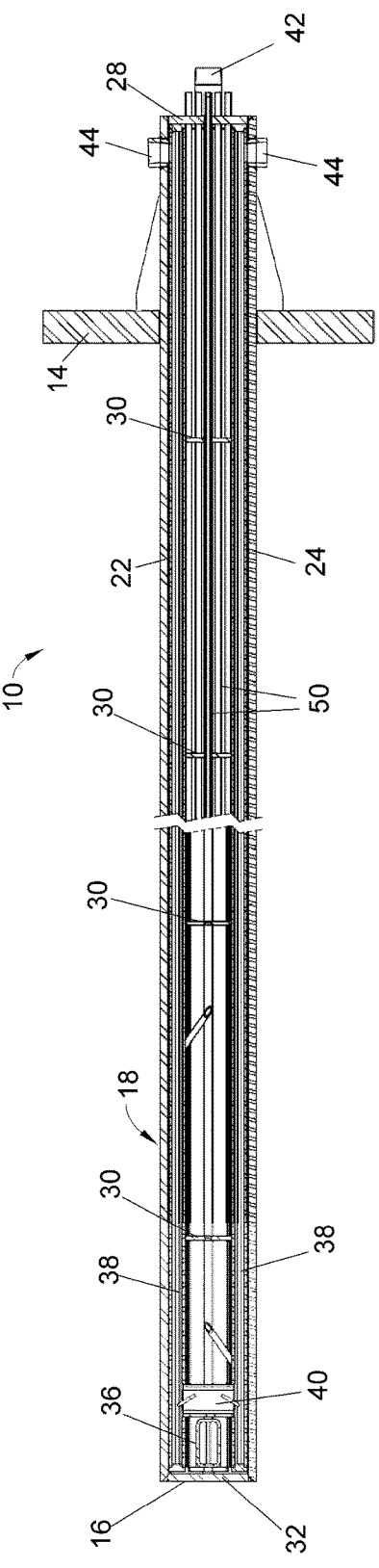
FIG. 5
FIG. 6

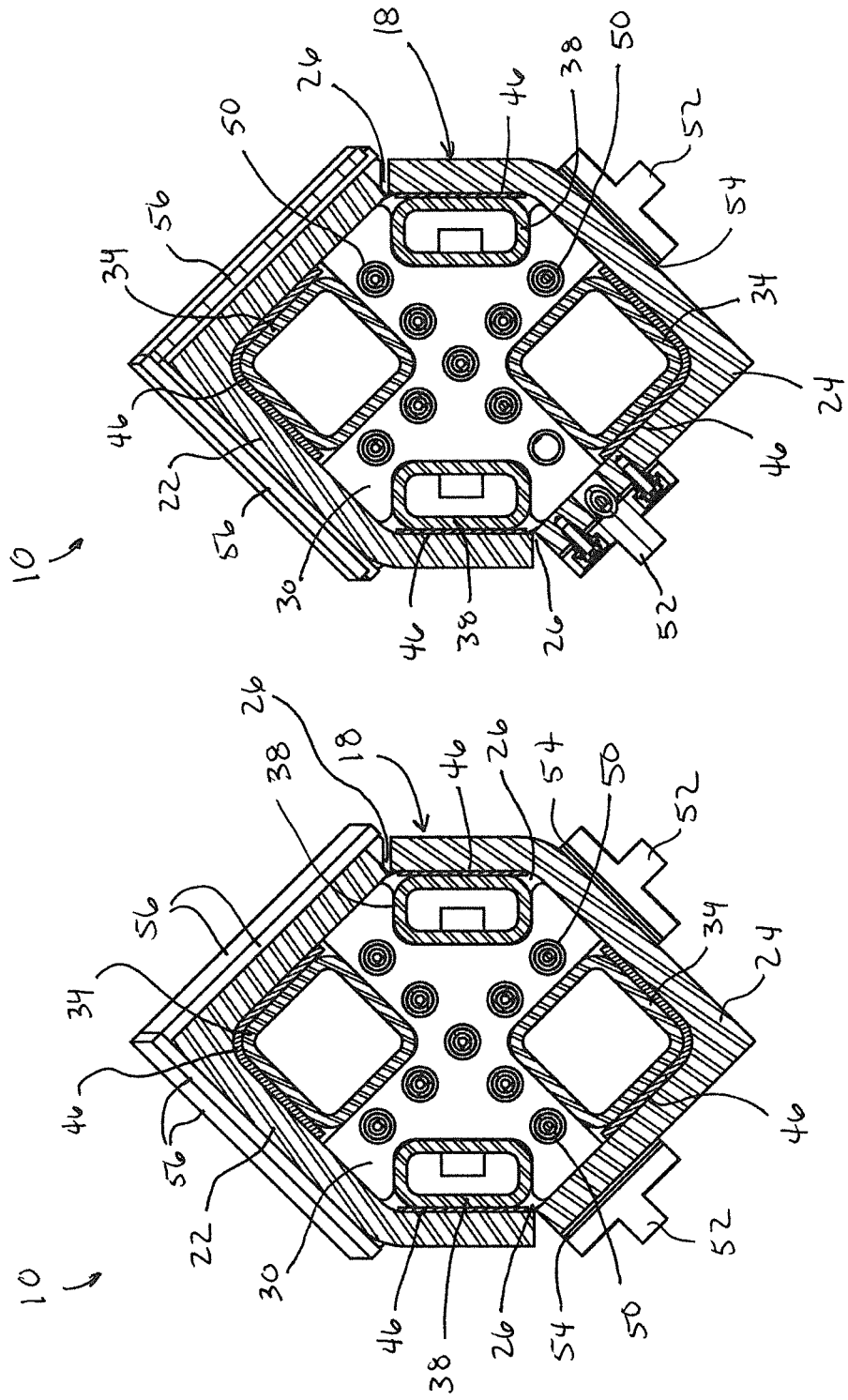

PROBES, BLAST FURNACES EQUIPPED THEREWITH, AND METHODS OF FABRICATING PROBES

CROSS REFERENCE TO RELATED APPLICATIONS

This application claims the benefit of U.S. Provisional Application No. 62/090,562, filed Dec. 11, 2014, the contents of which are incorporated herein by reference.

BACKGROUND OF THE INVENTION

The present invention generally relates to probes of types used in blast furnaces. More particularly, this invention relates to liquid-cooled above-burden probes of types intended to perform measurements, such as temperature, pressure and/or sampling of gases above burden materials within blast furnaces.

A blast furnace is a type of metallurgical furnace used to produce a metal from its ore (smelting), for example, iron, etc. In a typical blast furnace, ore, fuel, and flux materials (collectively referred to herein as "burden materials") are continuously batched through material charging equipment into the upper section of the furnace, while air is supplied through a lower section of the furnace. Chemical reactions take place within the burden materials to produce molten metal ("hot metal"), slag and flue (waste) gases. The molten metal and slag are removed from the lower section of the furnace, whereas before exiting the furnace the flue gases flow through a region of the furnace located above the burden materials, referred to as the throat.

The contents, processes and reactions within a blast furnace are commonly monitored by probes. As an example, probes located above the burden (hereinafter, above-burden probes) are used in blast furnaces to perform measurements on the flue gases flowing out through the surface of the burden materials and prior to exiting the furnace. Measurements performed by above-burden probes typically include temperature, though other or additional measurements may be performed, for example, pressure measurements, gas sampling, etc. An above-burden probe is typically located within the throat of the furnace, and usually cantilevered into the throat to project along a radial of the furnace. Multiple above-burden probes are often installed so as to be circumferentially spaced along the perimeter of the throat. If equipped to measure temperature, an individual above-burden probe may have multiple temperature sensors located along its length to provide a more detailed picture of the furnace operation. Traditionally, such temperature sensors are metallic sheathed thermocouples, in which the sensing junction of the thermocouple located at the thermocouple tip extends from the probe into the stream of flue gases that has exited the burden material through the surface of the burden material.

Above-burden probes are often cooled with a liquid coolant, usually water, to extend their lives. A typical construction of a water-cooled above-burden temperature probe comprises a large round pipe or square channel or tube that defines the outermost structure (shell) of the probe, and a central coolant feed pipe that runs the internal length of the probe, extending from the base of the probe (where the probe is mounted to the furnace) to the nose of the probe (disposed at the opposite cantilevered end of the probe). As such, the coolant enters the probe at its base, flows through the central feed pipe to the nose, and then returns to the base through an annular passage defined by and between the feed pipe and shell. With this type of construction, the probe relies on its shell as the containment for the coolant. The construction of an above-burden temperature probe may contain numerous weld joints, each having the potential for being a location at which coolant leakage may occur. In the event of coolant leakage, coolant flow must be stopped such that failure of the probe ultimately follows.

Thermocouples utilized in above-burden temperature probes are typically installed in a tube or channel that runs through the interior of the probe. Each thermocouple tip protrudes through the wall of the shell, and is therefore in thermal contact with and in close physical proximity to the coolant flowing within the shell. Consequently, the coolant temperature can influence the temperature read by the thermocouple, resulting in a degree of inaccuracy in the flue gas temperature reported by the thermocouple. Another complication is that dust generated within the blast furnace can accumulate on and adhere to the portion of the thermocouple protruding outward from the shell, rendering the thermocouple difficult to remove in the event that it requires replacement.

Certain drawbacks of conventional above-burden probes relate to their overall construction. High temperatures encountered by a probe ordinarily require a large volume of coolant flow through the probe. Coolant can be a significant contributor to the weight of a probe having a coolant circuit in which the coolant flows through a central feed pipe and then through an annular passage defined by a void between the feed pipe and probe shell, such that the coolant fills the entire interior cavity within the probe shell. The wall thickness of the shell must be increased to support the additional weight of the coolant, further adding to the overall weight of a probe and the structural demands associated with being cantilevered from the furnace wall. Cooling and structural requirements tend to result in probes whose shells are constructed from round pipes or square tubes, which present a relatively large obstruction to burden material being added to a furnace by the material charging equipment located above the probe. A large obstruction has the potential to significantly disrupt the distribution of the burden material charged into the furnace.

In view of the above, it should be appreciated that there are various shortcomings associated with conventional above-burden probe designs, and that overcoming one or more of these shortcomings would have the potential to improve the reliability and life of a probe and promote the overall operation of a blast furnace.

BRIEF DESCRIPTION OF THE INVENTION

The present invention provides probes suitable for performing measurements within a blast furnace. A particular embodiment is a liquid-cooled above-burden probe that is suitable for performing measurements on gases above the burden materials within a blast furnace.

According to one aspect of the invention, a probe includes a base, a shell connected to the base and constructed of at least first and second housing members that extend together along a length of the probe in a longitudinal direction thereof and define an interior cavity therebetween and between the base and a nose of the shell, and support structures interconnecting the first and second housing members. At least one of the support structures is disposed within the interior cavity of the shell. The probe further includes a coolant circuit comprising at least one coolant passage within the interior cavity of the shell. The coolant circuit extends along the length of the probe for cooling the shell, and the coolant passage is defined by at least a first tube supported by at least one of the support structures so that the first tube contacts at least one of the first and second housing members. At least one sensor is disposed in at least the second housing member for performing a measurement at an exterior of the shell.

Other aspects of the invention include method of fabricating a probe comprising the elements described above and blast furnaces equipped with a probe comprising the elements described above.

Technical effects of this invention include various design, construction and fabrication aspects capable of promoting the reliability, life, and/or operational performance of an above-burden probe. Certain technical effects may include one or more of the following: addressing structural causes of probe failure, addressing structural influences that contribute to measurement inaccuracies, and reducing the profile of a cantilevered probe with the potential for simultaneously promoting its strength.

Other aspects and advantages of this invention will be further appreciated from the following detailed description.

BRIEF DESCRIPTION OF THE DRAWINGS

FIGS. 5 and 6 represent cross-sectional views of the probe of FIGS. 1 through 4 along lines 5-5 and 6-6, respectively, of FIG. 4.

FIGS. 8, 9, 10 and 11 represent cross-sectional views of the probe of FIGS. 1 through 7 along lines 8-8, 9-9, 10-10, and 11-11, respectively, of FIG. 3.

DETAILED DESCRIPTION OF THE INVENTION

FIGS. 1 through 13 represent various views of one embodiment of an above-burden probe 10 encompassing certain aspects of the invention. The drawings disclose certain aspects for the various components of the probe 10 that are believed to be preferred or exemplary, but are otherwise not necessarily limitations to the scope of the invention.

Figure 1:
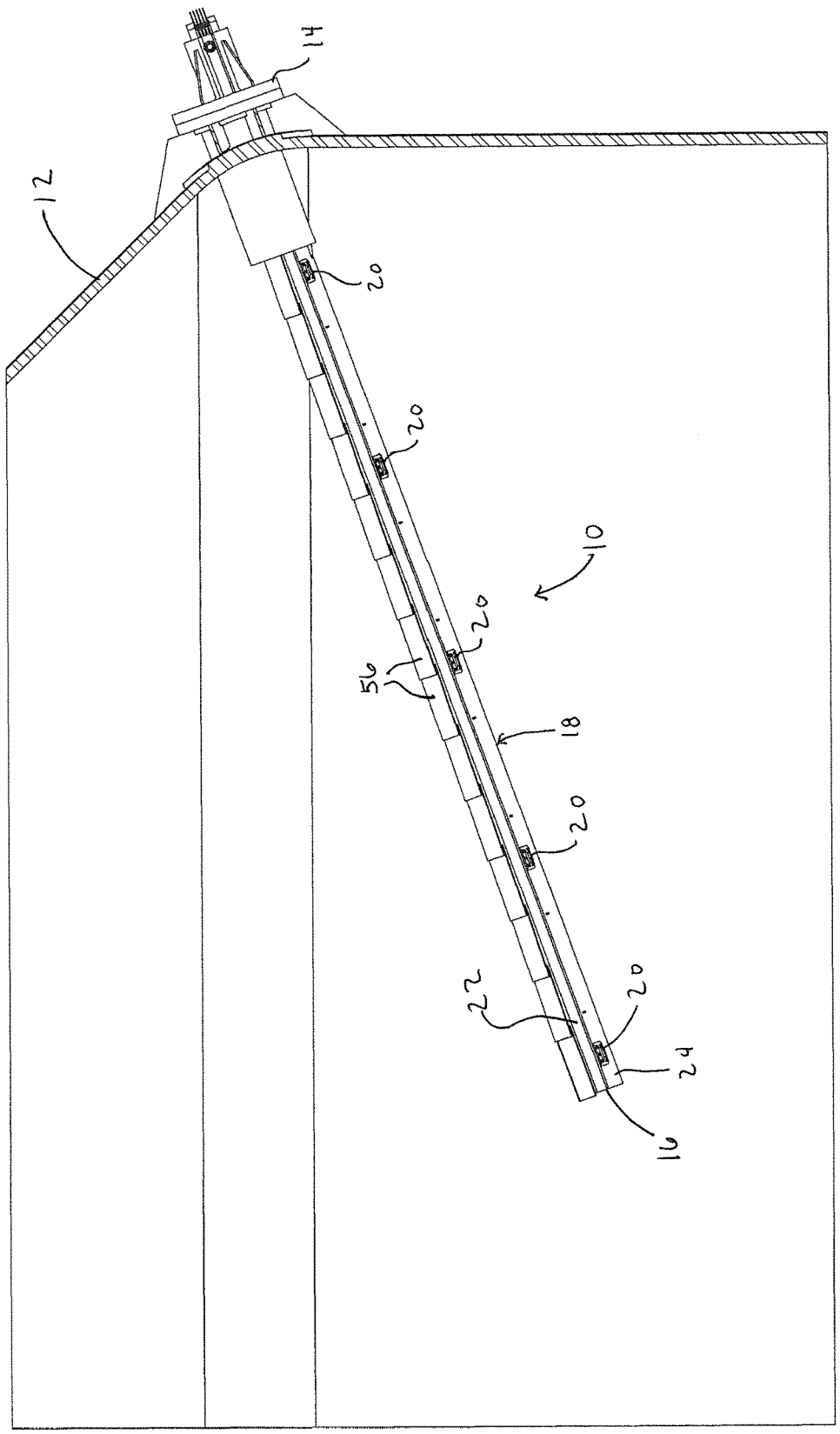
FIG. 1 schematically represents a side view of an above-burden probe installed in the throat of a blast furnace in accordance with a nonlimiting embodiment of the invention.
Figure 2:
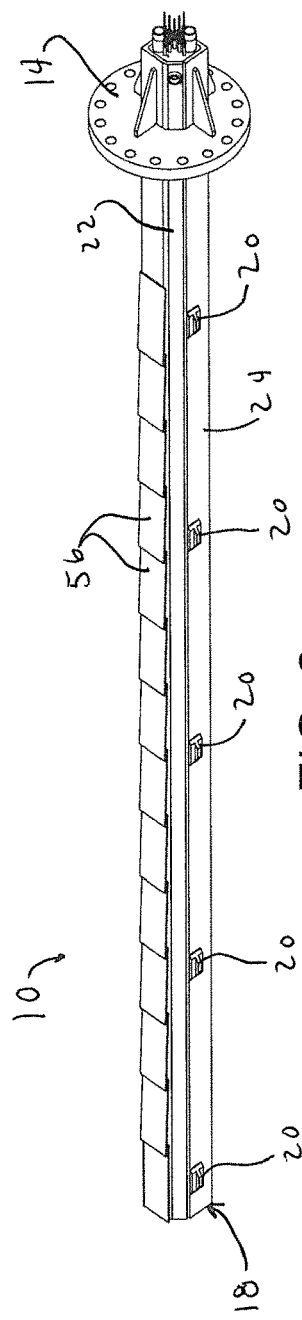
FIGS. 2, 3 and 4 are perspective, side and end views, respectively, of the probe of FIG. 1.
Figure 3:
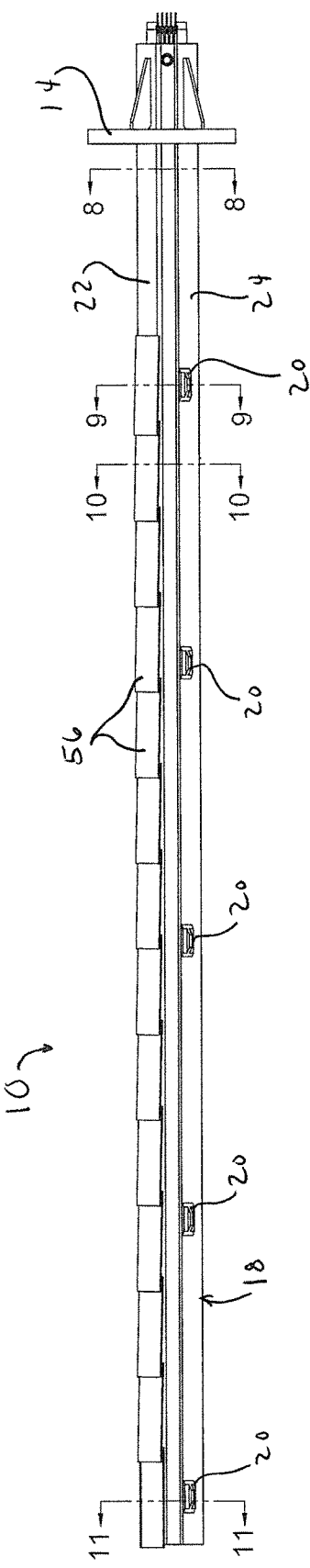

In FIG. 1, the probe 10 is shown installed in a wall 12 that surrounds and defines a throat of a blast furnace. The probe 10 is adapted for measuring one or more aspects and/or properties of flue gases flowing upward from a burden material (not shown) below the probe 10 and then through the throat prior to exiting the furnace. The probe 10 will be described in reference to measuring temperature, though other or additional measurements may be performed, for example, pressure measurements, gas sampling, etc.

To facilitate the description provided below of the embodiment represented in the drawings, relative terms, including but not limited to, "vertical," "horizontal," "lateral," "front," "rear," "side," "forward," "rearward," "upper," "lower," "above," "below," "right," "left," etc., may be used in reference to the orientation of the probe 10 generally as installed in a blast furnace as shown in FIG. 1, and therefore are relative terms that indicate the preferred construction, installation and use of the invention, but should not be otherwise interpreted as limiting the scope of the invention. The probe 10 is shown as being cantilevered into the throat and preferably projects along a radial of the furnace. The probe 10 may be one of any desired number of above-burden probes that might be installed in the throat.

The probe 10 is cooled with a liquid coolant, for example, water, that flows through a coolant circuit within the probe 10. As will be discussed in greater detail below, the coolant circuit preferably runs nearly the entire internal longitudinal length of the probe 10, extending from a base 14 of the probe 10 (used to secure the probe 10 to the furnace wall 12) to a nose 16 of the probe 10 disposed at the opposite cantilevered end of the probe 10. The outermost structure of the probe 10 is defined by a shell 18. A preferred construction of the probe 10 is represented in FIGS. 4 and 8 through 11 as including weld joints 26. However, in contrast to prior art probes of the type described previously, the probe 10 does not rely on the shell 18 as the containment for the coolant, and therefore the weld joints 26 are not required to be liquid-tight. Furthermore, the weld joints 26 are shown as disposed on the lateral sides of the probe 10, and therefore have reduced exposure to burden materials being charged into the furnace from above the probe 10 and hot gases flowing upward from the burden materials below the probe 10.

For the purpose of measuring temperature, the probe 10 is represented in FIG. 1 as having multiple temperature sensors 20 located along its longitudinal length that protrude through the shell 18 of the probe 10. The temperature sensors 20 may be of any suitable type, though are preferably consistent with the description below in reference to FIGS. 12 and 13. As will be discussed, the sensors 20 preferably make use of thermocouples whose tips (sensing junctions) 48 do not extend from the probe 10 in a manner that directly exposes the thermocouple tips 48 to the stream of flue gases within the furnace.

Figure 4:
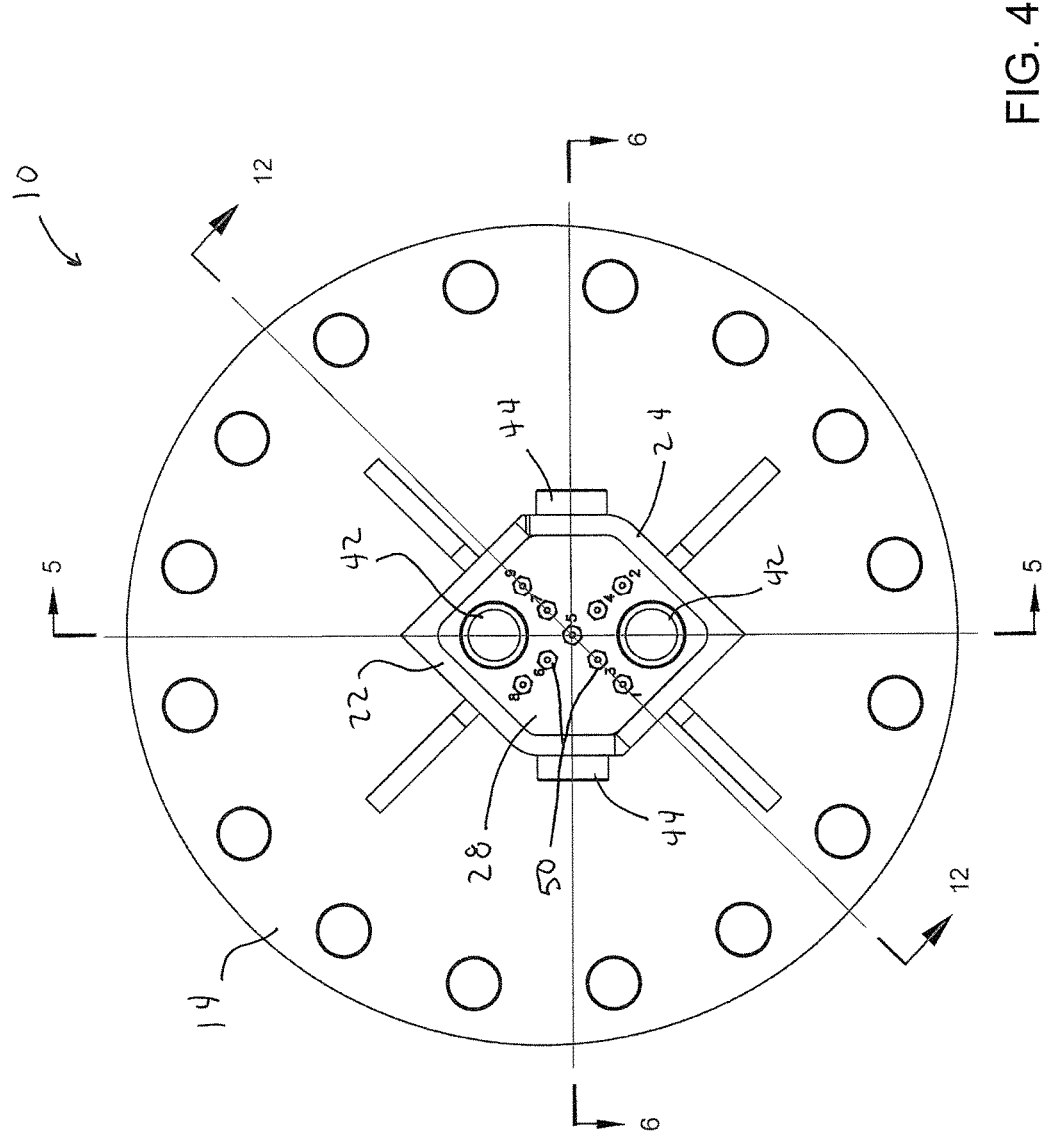

The general construction of the probe 10 will be described in reference to FIGS. 1 through 11. As represented in FIGS. 4 and 8 through 11, a preferred construction of the probe shell 18 utilizes two housing members 22 and 24 that extend essentially the entire length of the probe 10 to define the shell 18 and an interior cavity within the shell 18. As will be apparent from FIGS. 4 and 8 through 11, each housing member 22 and 24 can be fabricated from a structural angle initially having an L-shaped cross section, but with one leg bent as shown such that the shell 18 formed by the housing members 22 and 24 has a six-sided polygonal cross-sectional shape. As a result of the housing members 22 and 24 being joined edge to edge in a clamshell-like manner as shown in FIG. 4, the upper side of the shell 18 is entirely defined by the housing member 22 and the lower side of the shell 18 is entirely defined by the housing member 24. In a current embodiment, the members 22 and 24 are fabricated from ASTM A572, though it is foreseeable that other materials could be used. The housing members 22 and 24 are secured to each other (and to the coolant circuit) through combinations of the weld joints 26 and support plates 28, 30 and 32 represented in FIGS. 4 and 8 through 11. The support plates 28 and 32 generally close the opposite ends of the shell 18 at its base 14 and nose 16, respectively, whereas the support plates 30 support the housing members 22 and 24 from within the interior cavity of the shell 18. Though the support plates 28, 30 and 32 are referred to herein as "plates," it should be understood that this term is not intended to suggest a limitation on shape in that a wide variety of support structures capable of providing the support function described herein could foreseeably be used as any one or more of the plates 28, 30 and 32.

Figure 7:
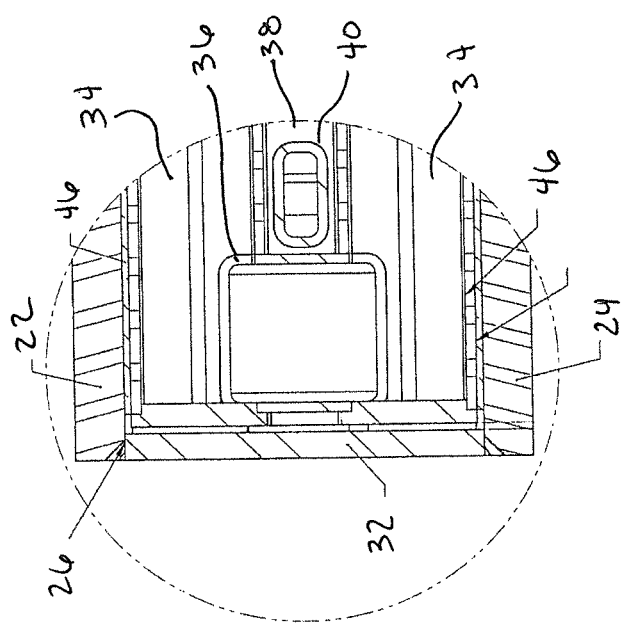
FIG. 7 is an enlarged view of the end of the cross-sectional view of the probe in FIG. 5.
Figure 11:
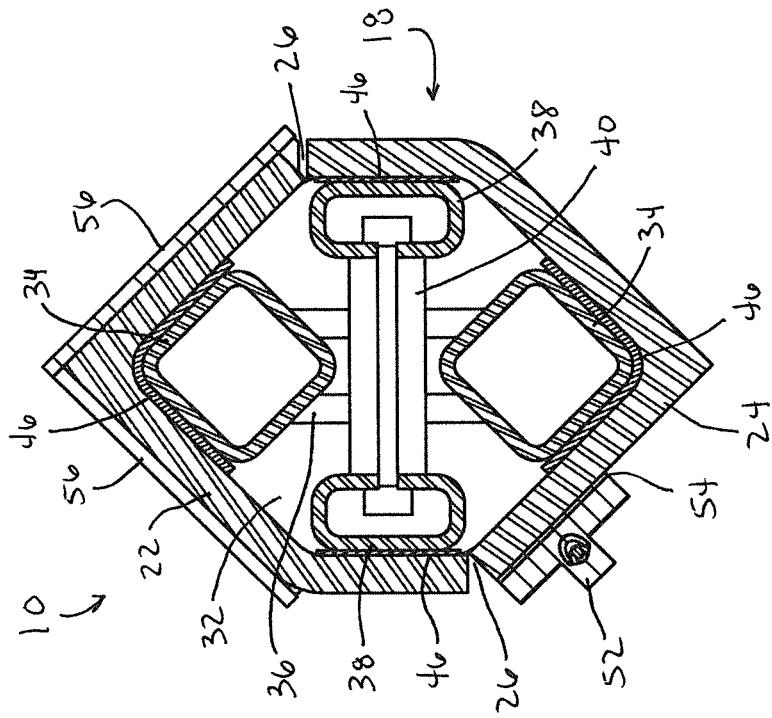
Figure 10:
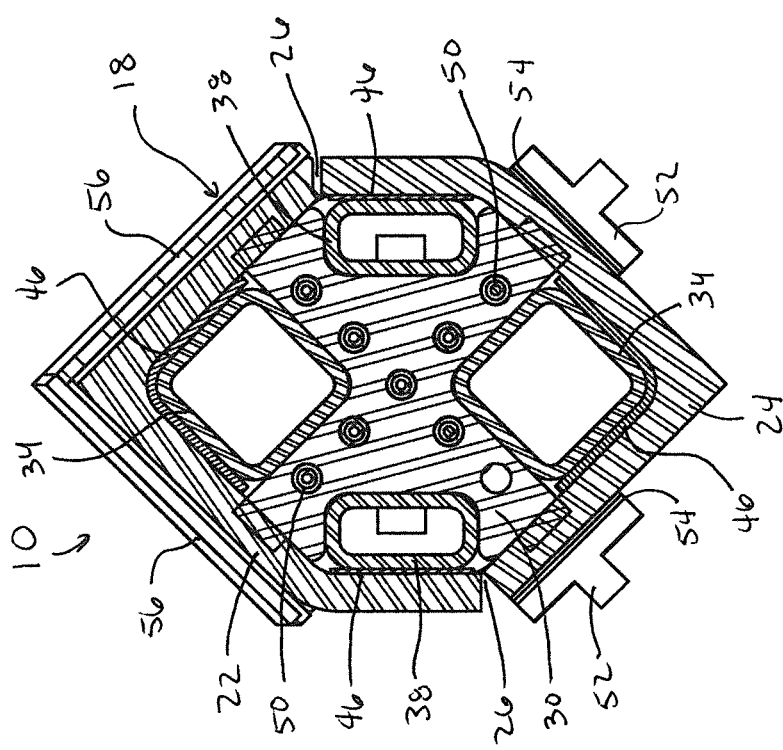

FIGS. 4 and 8 through 11 further represent components of the coolant circuit, of which further details can be seen in FIGS. 5 through 7. The embodiment of the coolant circuit shown in the figures comprises two separate coolant passages that are fluidically isolated within the probe 10. A first of the coolant passages is defined by two tubes 34 that are spaced vertically within the shell 18 and fluidically interconnected by a coupling 36 near the nose 16 of the shell 18 (FIG. 5). The second passage is defined by two tubes 38 that are spaced horizontally within the shell 18 and fluidically interconnected by a coupling 40 located near the shell nose 16 (FIG. 6), with the coupling 36 being between the coupling 40 and the support plate 32 at the nose 16 of the shell 18 (FIG. 7). The tubes 34 and 38 and couplings 36 and 40 are represented as having rectangular cross-sections, though other shapes are foreseeable. As seen in FIG. 4, the first coolant passage defined by the tubes 34 has two ports 42 located in the support plate 28 that serve as an inlet and outlet to the first coolant passage, and the second coolant passage defined by the tubes 38 has two ports 44 located in the housing members 22 and 24 that serve as an inlet and outlet to the second coolant passage. As evident in FIGS. 8 through 11, the tubes 34 and 38 are in thermal conductive contact with the housing members 22 and 24 so that the coolant within the tubes 34 and 38 serves to cool the probe shell 18 formed by the members 22 and 24. Thermal contact between the tubes 34 and 38 and members 22 and 24 can be promoted through thermally conductive shims 46, as non-limiting examples, formed of brass or copper. As shown in FIGS. 8 through 10, the tubes 34 and 38 are supported within the shell 18 by the support plates 30, which also serve to maintain thermal conductive contact between the tubes 34 and 38, shims 46, and housing members 22 and 24. The support plates 30 are represented as being generally X-shaped to define four legs that extend in diagonal directions, with the tubes 34 nested between the legs on the upper and lower sides of each plate 30 and the tubes 38 nested between the legs on opposite lateral sides of each plate 30.

Figure 12:
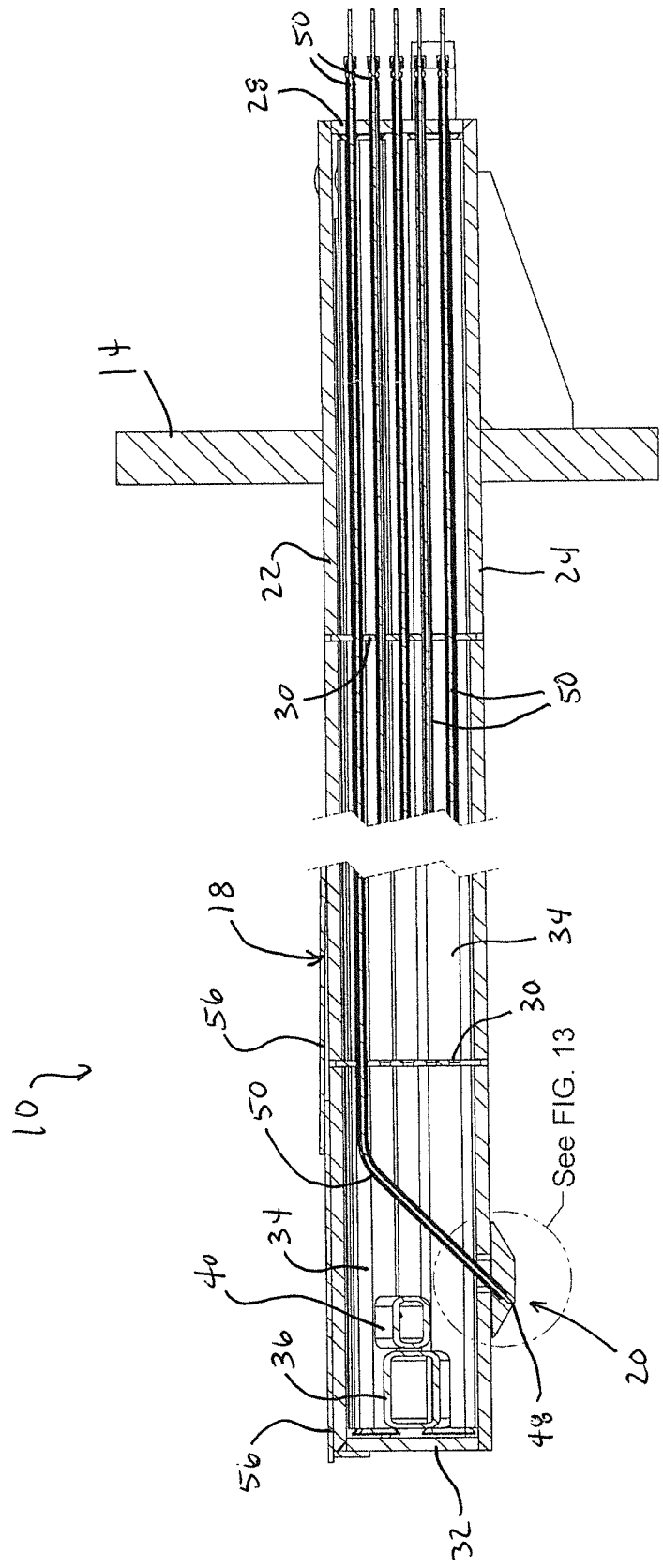
FIG. 12 represents a cross-sectional view of the probe of FIGS. 1 through 11 along line 12-12 of FIG. 4.
Figure 13:
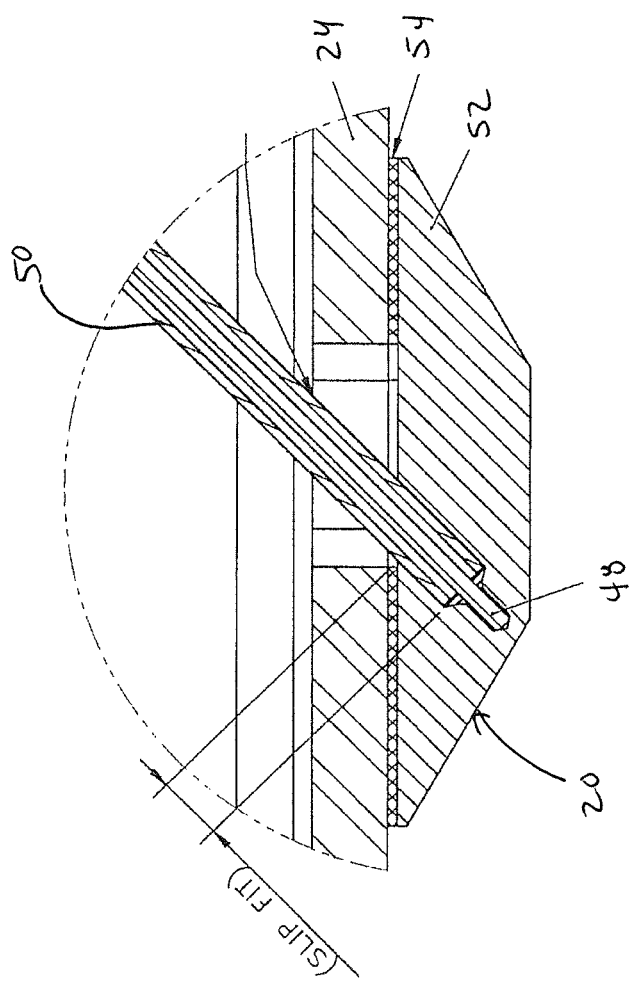
FIG. 13 is a detail of the cross-sectional view of the probe in FIG. 12.

As noted above, the temperature sensors 20 are thermocouples, each having a sensing element (junction) located at the thermocouple tip 48 (FIGS. 12 and 13). The thermocouple tips 48 preferably do not extend from the probe 10 in a manner that would directly expose the tips 48 to the stream of flue gases within the furnace. As such, dust generated within the blast furnace cannot accumulate on or adhere to the thermocouple tips 48, and therefore does not interfere with the ability to remove a sensor 20 in the event it requires replacement. In addition, the thermocouple tips 48 are not in direct physical contact with the coolant flowing within tubes 34 and 38 of the coolant circuit, so that the coolant temperature has a reduced influence on the temperatures read by the sensors 20. The sensors 20 are depicted in FIGS. 12 and 13 as sheathed thermocouples which contain sensing junctions within their tips 48 and interconnecting wiring to the sheathed thermocouple base located outside of the probe 10. The sheathed thermocouples are inserted through tubes 50 supported by the support plates 28 and 30. As evident from FIGS. 8-10, the tubes 50 can pass through openings in the legs of the plates 30, such that the tubes 50 are arranged within the probe 10 to define an X-shaped pattern as evident from FIGS. 4 and 8 through 10. The thermocouple tips 48 of the sensors 20 are embedded in a well 52 attached to the housing member 24, but separated therefrom by a thermal insulating gasket 54 to reduce the influence that the housing member 24 (cooled by the coolant tubes 34 and 38) will have on temperatures sensed by the sensors 20. Additionally, from FIGS. 8 through 11 it can be seen that the wells 52 are mounted to portions of the housing member 24 that are between portions of the plate 24 that are in contact with the coolant tubes 34 and 38, such that the plate 24 is immediately between the tips 48 and a portion of the interior cavity of the shell 18 that contains a gas (e.g., air, flue gases, etc.). This arrangement further separates the thermocouple tips 48 from the coolant to reduce the influence that the coolant will have on temperatures sensed at the tips 48.

As discussed above, each of the tubes 34 and 38 of the coolant circuit is nested between the legs on one of the upper, lower and lateral sides of each plate 30. As a result, each tube 34 and 38 is also disposed between legs of an X-shaped pattern defined by the sensor tubes 50, so that the tubes 34 are on opposite vertical sides of the X-shaped pattern and the tubes 38 are also on opposite horizontal sides of the X-shaped pattern. The result is a symmetrical arrangement of internal components within the cavity of the shell 18.

In addition to the operational advantages summarized above, the overall construction of the probe 10 provides structural advantages. Though high temperatures encountered by the probe 10 may require a large volume of coolant flow through the tubes 34 and 38, the tubes 34 and 38 account for only a fraction of the total volume of the interior cavity of the shell 18 (typically less than half, e.g., about 20%), and therefore the volume of coolant required by the probe 10 can be considerably less in comparison to conventional probes whose interiors are completely filled with coolant. As such, the coolant within the probe 10 contributes much less to the weight of the probe 10, and the wall thickness of the shell 18 can be less than that of conventional probes.

The profile of the probe 10 can also be less than that of conventional probes having round or rectangular-shaped cross-sections, and therefore present a relatively smaller obstruction to burden material being added to the furnace. In particular, the cross-section of the probe 10 in the horizontal direction can be seen in FIGS. 8 through 10 to be less than (roughly two-thirds) the vertical direction.

The welded construction, which results from the housing members 22 and 24 being fabricated from structural angles to create a six-sided polygonal cross-sectional shape for the shell 18, is also believed to be stronger and more rigid in the vertical direction than a conventional probe having a round or rectangular-shaped cross-section. The clamshell-like manner in which the housing members 22 and 24 are joined is also structurally advantageous since the upper and lower sides of the shell 18, which are directly subjected to burden materials being charged into the furnace and hot gases flowing upward from the burden materials below the probe 10, are entirely defined by either the housing member 22 or the housing member 24. The construction of the shell 18 from housing members 22 and 24 that extend together along the length of the probe 10 also facilitates the assembly of the probe 10, including the placement of the coolant circuit, sensors, tubes, and other internal components of the probe 10.

Finally, the embodiment of the probe 10 shown in the figures includes protective plating 56 attached to the upper housing member 22, and therefore serves to provide additional protection to the shell 18 from damage by burden materials being charged into the furnace from above the probe 10. The plating 56 is shown as having a shingled arrangement, with the distal edge of a plating 56 (i.e., the edge farthest from the furnace wall 12) overlapping the proximal edge of the next plating 56 located distally from the overlapping plating 56. Shingling of the plating 56 in this manner serves to promote the flow of burden materials over the upward-facing surfaces of the plating 56, protecting the probe shell 18 from exposure to the burden materials.

While the invention has been described in terms of a specific embodiment, it is apparent that other forms could be adopted by one skilled in the art. For example, the probe 10 could differ in appearance and construction from the embodiment shown in the Figures, the functions of each component of the probe 10 could be performed by components of different construction but capable of a similar (though not necessarily equivalent) function, and various processes and materials could be used in the construction of the probe 10 and its components. Accordingly, it should be understood that the invention is not limited to the specific embodiment illustrated in the Figures. It should also be understood that the phraseology and terminology employed above are for the purpose of disclosing the illustrated embodiment, and do not necessarily serve as limitations to the scope of the invention. Therefore, the scope of the invention is to be limited only by the following claims.

The invention claimed is:

1. A probe comprising:
   a base;
   a shell connected to the base, the shell being constructed of at least first and second housing members that extend together along a length of the probe in a longitudinal direction thereof and are joined in a clamshell-like manner to define an interior cavity therebetween and between the base and a nose of the shell;
   support structures interconnecting the first and second housing members, at least a first of the support structures being disposed within the interior cavity of the shell;
   a coolant circuit comprising at least a first coolant passage within the interior cavity of the shell, the first coolant passage extending along the length of the probe for cooling the shell, the first coolant passage being defined by at least a first tube supported by the first support structure and contacting at least one of the first and second housing members; and
   at least one sensor disposed in at least the second housing member for performing a measurement at an exterior of the shell.

2. The probe according to claim 1, wherein the first tube contacts the first housing member and the first coolant passage is further defined by at least a second tube that is supported by the first support structure and contacts the second housing member.

3. The probe according to claim 2, wherein the coolant circuit comprises at least a second coolant passage that is fluidically isolated from the first coolant passage within the probe.

4. The probe according to claim 3, wherein the second coolant passage is within the interior cavity of the shell, supported by the first support structure, and contacts at least one of the first and second housing members.

5. The probe according to claim 4, wherein the first and second tubes of the first coolant passage are spaced vertically within the shell and fluidically interconnected by a first coupling near the nose of the shell.

6. The probe according to claim 5, wherein the second coolant passage is defined by third and fourth tubes that are spaced horizontally within the shell and fluidically interconnected by a second coupling located near the nose of the shell.

7. The probe according to claim 6, wherein the third and fourth tubes of the second coolant passage contact, respectively, the first and second housing members.

8. The probe according to claim 7, wherein the first support structure is X-shaped to define four legs that extend in diagonal directions thereof, the first and second tubes of the first coolant passage are nested between the legs on upper and lower sides of the first support structure, and the third and fourth tubes of the second coolant passage are nested between the legs on opposite lateral sides of the first support structure.

9. The probe according to claim 1, wherein the first housing member is an upper housing member of the shell, the second housing member is a lower housing member of the shell, and the first and second housing members are joined together along lateral sides of the shell.

10. The probe according to claim 9, further comprising a well mounted exteriorly to the second housing member, the sensor having a sensing junction embedded in the well.

11. The probe according to claim 10, further comprising a thermal insulator disposed between the well and the second housing member.

12. The probe according to claim 1, further comprising wiring routed through the interior cavity of the shell to the sensor and supported within the interior cavity by at least the first support structure.

13. The probe according to claim 1, wherein the at least one sensor comprises multiple sensors each having wiring routed through the interior cavity of the shell to the sensor and supported within the interior cavity by at least the first support structure.

14. The probe according to claim 13, wherein the first support structure is X-shaped to define four legs that extend in diagonal directions thereof, and the wiring passes through the legs of the first support structure and define an X-shaped pattern within the interior cavity.

15. The probe according to claim 14, wherein the coolant circuit comprises at least a second coolant passage that is fluidically isolated from the first coolant passage within the probe, the first coolant passage has a second tube and the first and second tubes of the first coolant passage are spaced vertically within the shell and fluidically interconnected by a first coupling, the second coolant passage is defined by third and fourth tubes that are spaced horizontally within the shell and fluidically interconnected by a second coupling, the first and second tubes of the first coolant passage are disposed between the legs of the first support structure on opposite sides of the X-shaped pattern, and the third and fourth tubes of the second coolant passage are disposed between the legs of the first support structure on opposite sides of the X-shaped pattern.

16. The probe according to claim 1, wherein each of the first and second housing members is fabricated from a structural angle initially having an L-shaped cross section but with at least one leg thereof bent so that the shell has a polygonal cross-sectional shape having at least six sides.

17. The probe according to claim 1, further comprising protective plating exteriorly attached to the first housing member, the plating comprising multiple plates having a shingled arrangement with a distal edge of each of the plates overlapping a proximal edge of an immediately adjacent one of the plates.

18. The probe according to claim 17, wherein the first housing member is an upper housing member of the shell, the second housing member is a lower housing member of the shell, and the first and second housing members are joined together along lateral sides of the shell.

19. The probe according to claim 1, wherein the probe is an above-burden probe of a blast furnace.

20. The probe according to claim 19, wherein the above-burden probe is installed in the blast furnace.

21. The probe according to claim 1, wherein the sensor is a temperature sensor.

22. The probe according to claim 21, wherein the probe is an above-burden probe installed in a blast furnace, and the second housing member and the sensor attached thereto face downward toward a burden material within the blast furnace.

23. A probe comprising:
a base;
a shell connected to the base, the shell being constructed of at least first and second housing members that extend together along a length of the probe in a longitudinal direction thereof and define an interior cavity therebetween and between the base and a nose of the shell;
support structures interconnecting the first and second housing members, at least a first of the support structures being disposed within the interior cavity of the shell;
a coolant circuit comprising at least a first coolant passage within the interior cavity of the shell, the first coolant passage extending along the length of the probe for cooling the shell, the first coolant passage being defined by at least a first tube supported by the first support structure and contacting at least one of the first and second housing members;
at least one sensor disposed in at least the second housing member for performing a measurement at an exterior of the shell; and
a well mounted exteriorly to the second housing member, the sensor having a sensing junction embedded in the well;
wherein the first housing member is an upper housing member of the shell, the second housing member is a lower housing member of the shell, and the first and second housing members are joined together along lateral sides of the shell.

24. A probe comprising:
a base;
a shell connected to the base, the shell being constructed of at least first and second housing members that extend together along a length of the probe in a longitudinal direction thereof and define an interior cavity therebetween and between the base and a nose of the shell;
support structures interconnecting the first and second housing members, at least a first of the support structures being disposed within the interior cavity of the shell;
a coolant circuit comprising at least a first coolant passage within the interior cavity of the shell, the first coolant passage extending along the length of the probe for cooling the shell, the first coolant passage being defined by at least a first tube supported by the first support structure and contacting at least one of the first and second housing members; and
at least one sensor disposed in at least the second housing member for performing a measurement at an exterior of the shell;
wherein the at least one sensor comprises multiple sensors each having wiring routed through the interior cavity of the shell to the sensor and supported within the interior cavity by at least the first support structure, the first support structure is X-shaped to define four legs that extend in diagonal directions thereof, and the wiring passes through the legs of the first support structure and defines an X-shaped pattern within the interior cavity.

* * * * *